March 11, 1924.
S. J. BETLEY
1,486,626
SPITTOON CLEANER
Filed Oct. 19, 1922
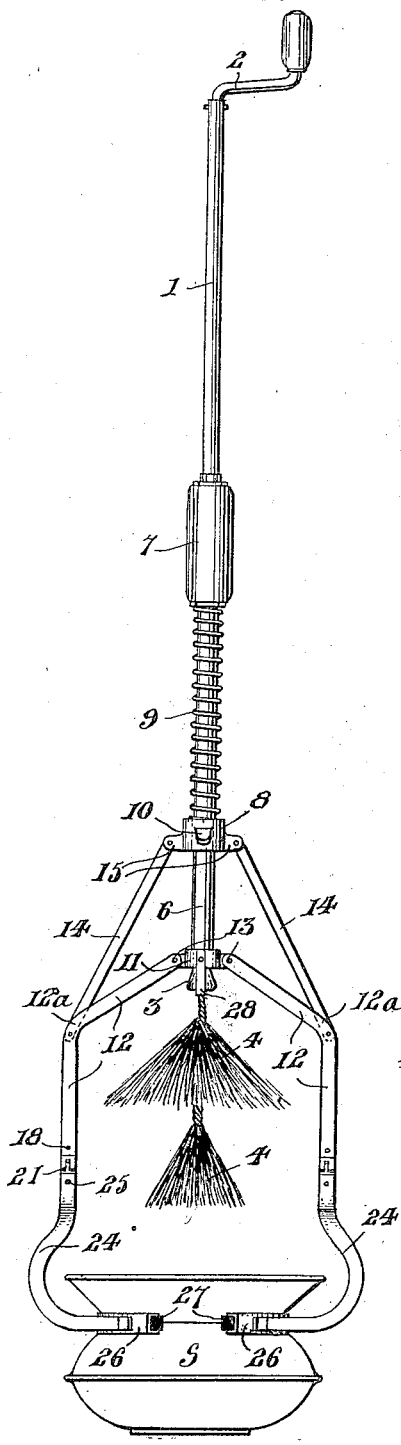
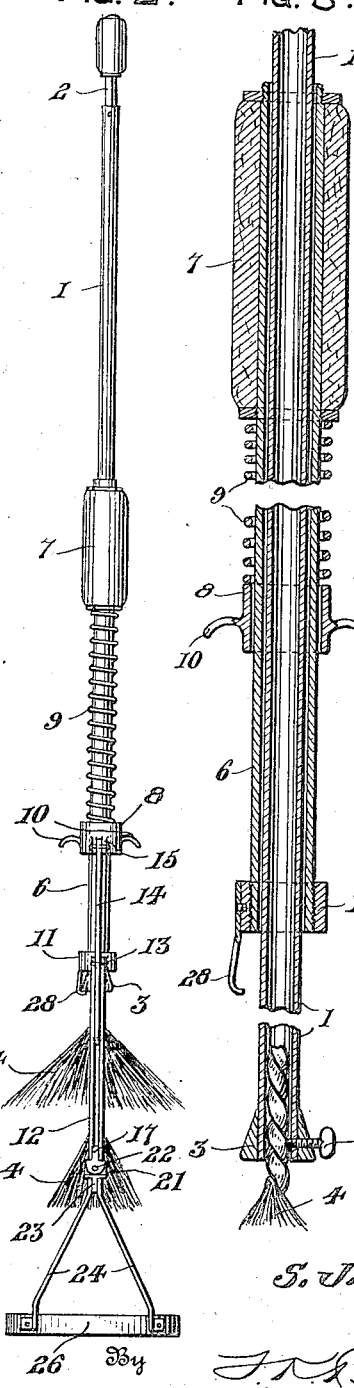
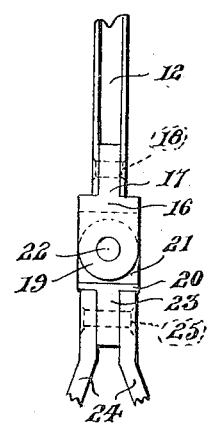
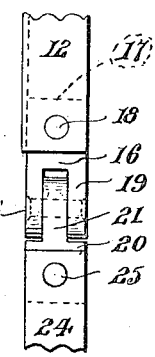
Inventor
S. J. Betley
By
F. L. Bryant
Attorney Patented Mar. 11, 1924.

1,486,626

UNITED STATES PATENT OFFICE.

STANISLAW J. BETLEY, OF PHILADELPHIA, PENNSYLVANIA.

SPITTOON CLEANER.

Application filed October 19, 1922. Serial No. 595,575.

*To all whom it may concern:*

Be it known that I, STANISLAW J. BETLEY, a citizen of the United States of America, residing at Philadelphia, in the county of Philadelphia and State of Pennsylvania, have invented certain new and useful Improvements in Spittoon Cleaners, of which the following is a specification.

This invention relates to certain new and useful improvements in spittoon cleaners and has particular reference to a portable hand operated device and includes various structural changes and improvements over the patent granted to S. Betley for improvements in spittoon cleaners, dated November 11, 1919, Patent No. 1,321,279.

The primary object of the invention resides in the provision of a spittoon cleaner wherein a handle rod carrying a brush at its lower end is freely slidable through and rotatable in a tubular casing that pivotally supports spittoon gripping arms at the lower end thereof.

A further object of the invention is to provide in a spittoon cleaner of the type above set forth, a tensioned collar slidably mounted upon the tubular casing enclosing the handle rod with the spittoon gripping arms pivotally connected to said collar to be opened and closed thereby upon sliding movement thereof.

With the above and other objects in view, the invention consists of the novel form, combination and arrangement of parts hereinafter more fully described, shown in the accompanying drawing and claimed.

In the drawing, wherein like reference characters designate corresponding parts throughout the several views, Figure 1 is a side elevational view of a spittoon cleaner constructed in accordance with the present invention showing the same operatively positioned upon a spittoon and with the handle rod carrying the cleaning brush elevated and latched in an inoperative position, Figure 2 is an edge elevational view of the device, Figure 3 is a fragmentary longitudinal sectional view showing the tubular casing enclosing the slidable and rotatable handle rod carrying the cleaning brush and the tensioned collar to which the gripping arms for a spittoon are pivoted.

Figure 4 is a fragmentary detail view showing the pivotal connection between the spittoon gripping jaws and the levers carrying the same, and Figure 5 is a fragmentary detail view taken at right angles to that shown in Fig. 4.

Referring more in detail to the accompanying drawing, there is illustrated a spittoon cleaner embodying a tubular handle rod 1 having a crank handle 2 fixed in the outer end thereof as shown in Figs. 1 and 2, the inner or lower end of the handle rod 1 having a cone-shaped collar 3 suitably anchored thereon as shown in Fig. 3, while the twisted shank portion of a cleaning brush 4 is inserted in the lower open end of the handle rod and anchored therein by the set screw 5 passing through the cone-shaped collar and the side wall of the handle rod.

A tubular casing 6 encloses the handle rod 1, as clearly shown in Fig. 3, the handle rod being freely slidable through and rotatable in the casing 6. A hand grip 7 is anchored to the outer end of the tubular casing 6 while a collar 8 associated with the gripping jaws for a spittoon is normally spaced from the hand grip 7 by the coil spring 9 surrounding the tubular casing between the hand grip and collar 8, movement of the collar upon the tubular casing being facilitated by the finger grips 10 as clearly illustrated.

The gripping jaws for the spittoon are pivotally connected to the inner end of the tubular casing 6, a collar 11 being threaded upon the inner end of the tubular casing and rigidly connected thereto as shown in Fig. 3, while angularly disposed lever arms 12 are oppositely pivoted as at 13 to the rigid collar 11 as shown in Fig. 1. The angle lever arms 12 are of channel formation as shown in Fig. 4, and at the angle bends 12ª thereof, one end of a link 14 is pivotally mounted, while the other end of said link is pivotally connected to a lug 15 carried by the sliding collar 8.

As shown in Figs. 2, 4 and 5, a block 16 carries a lug extension 17 which is positioned in the lower end of the channel lever arm 12 and secured in position by the rivets 18, the block 16 being bifurcated to provide guide arms 19. A coacting block 20 carries a lug 21 extending between the side arms 19 of the block 16 and is pivoted therein by the cross pin 22, the opposite face of the block 20 carries a lug 23 to the opposite faces of which the upper ends of the side arms of the clamping jaws are secured as at 25, the arms 24 diverging downwardly as shown in Figs. 2 and 4, and being curved outwardly and inwardly as shown in Fig. 1 with the clamping head 26 secured to the lower ends thereof and carrying a cushioned block 27 for engagement with the neck portion of the spittoon S.

In the operation of the device, the handle rod 1 is retracted or elevated as shown in Fig. 1 to position the cone-shaped collar 3 for engagement by the spring finger 28 carried by the rigidly mounted collar 11 as shown in Figs. 1 and 3. In this position, the operator grasps the hand grip 7 and also engages the side fingers 10 upon the sliding collar 8 to elevate the collar against the tension of the spring 9 for moving the angle lever arms 12 upon their pivotal connections 13 with the rigidly mounted collar 11, the links 14 shifting the lever arms 12 and spreading or separating the gripping jaws as will be obvious from an inspection of Fig. 1. The pivotal connection 22 between the lower ends of the lever arms 12 and the gripping jaw arms 24 permits the device to be placed in a substantially horizontal position during the act of placing the same in operative position upon a spittoon with a subsequent perpendicular arrangement thereof. By pressing axially upon the outer end of the handle rod 1, the spring finger 28 is disengaged from the collar 3 upon the lower end of the handle rod 1 and the brush head 4 is lowered into engagement with the inner walls of the spittoon for cleaning the same. By grasping the hand grips 7, and rotating the crank arm 2 upon the upper end of the handle rod 1, the brush head 4 is rotated within the spittoon for thoroughly cleaning the same, while the gripping jaws carried by the lever arms 12 hold the spittoon rigidly positioned during the act of cleaning, and may also be employed for transporting the same.

While there is herein shown and described the preferred embodiment of the present invention, it is nevertheless to be understood that minor changes may be made therein without departing from the spirit and scope of the invention as claimed.

What is claimed as new is:—

1. In a spittoon cleaner, a handle rod, a brush head carried by the inner end thereof, a tubular casing through which the handle rod is slidable and rotatable, sliding and fixed collars mounted on the tubular casing, a hand grip carried by the outer end of the casing, gripping jaws pivotally connected to the fixed collar, link connections between the pivoted jaws and the sliding collar, and a spring device associated with the hand grip and sliding collar for holding the jaws in closed position.

2. In a spittoon cleaner, a handle rod, a brush head carried by the inner end thereof, a tubular casing through which the handle rod is slidable and rotatable, sliding and fixed collars mounted on the tubular casing, a hand grip carried by the outer end of the casing, gripping jaws pivotally connected to the fixed collar, link connections between the pivoted jaws and the sliding collar, a spring device associated with the hand grip and sliding collar for holding the jaws in closed position, and a spring finger carried by the fixed collar adapted for engagement with the lower end of the handle rod for holding the same in a retracted elevated position.

3. In a spittoon cleaner, a handle rod, a brush head carried by the inner end thereof, a tubular casing through which the handle rod is slidable and rotatable, sliding and fixed collars mounted on the tubular casing, a hand grip carried by the outer end of the casing, gripping jaws pivotally connected to the fixed collar, link connections between the pivoted jaws and the sliding collar, a spring device associated with the hand grip and sliding collar for holding the jaws in closed position, said gripping jaws including angle lever arms of channel formation having the links pivoted therein between the side walls and at the angle points.

4. In a spittoon cleaner, a handle rod, a brush head carried by the inner end thereof, a tubular casing through which the handle rod is slidable and rotatable, sliding and fixed collars mounted on the tubular casing, a hand grip carried by the outer end of the casing, gripping jaws pivotally connected to the fixed collar, link connections between the pivoted jaws and the sliding collar, a spring device associated with the hand grip and sliding collar for holding the jaws in closed position, said gripping jaws including angle lever arms of channel formation having the links pivoted therein between the side walls and at the angle points, and further including gripping heads pivoted to the lower ends of the angle lever arms, the pivotal connections embodying coacting lugs carried by the lever arms and gripping heads.

In testimony whereof I affix my signature.

STANISLAW J. BETLEY.